US012036815B2

(12) United States Patent
Welper

(10) Patent No.: US 12,036,815 B2
(45) Date of Patent: Jul. 16, 2024

(54) PAINT WORKSTATION HAVING COOPERATING PAINT ROLLER AND RELATED ACCESSORIES

(71) Applicant: Tiki Bird Enterprises, LLC, Caledonia, MN (US)

(72) Inventor: Lance Welper, Caledonia, MN (US)

(73) Assignee: Tiki Bird Enterprises, LLC, Caledonia, MN (US)

( * ) Notice: Subject to any disclaimer, the term of this patent is extended or adjusted under 35 U.S.C. 154(b) by 173 days.

(21) Appl. No.: 17/650,224

(22) Filed: Feb. 7, 2022

(65) Prior Publication Data

US 2023/0249491 A1 Aug. 10, 2023

(51) Int. Cl.
*B44D 3/14* (2006.01)
*B44D 3/12* (2006.01)

(52) U.S. Cl.
CPC ............... *B44D 3/14* (2013.01); *B44D 3/125* (2013.01); *B44D 3/126* (2013.01)

(58) Field of Classification Search
CPC ........... B44D 3/14; B44D 3/125; B44D 3/126
See application file for complete search history.

(56) References Cited

U.S. PATENT DOCUMENTS 3,100,313 A * 8/1963 Ernst ...................... B44D 3/126 15/257.06
3,156,510 A * 11/1964 Hindin ................. A47B 67/005 312/223.5
3,394,666 A * 7/1968 Pearlman ................. A47B 3/10 108/135
3,947,135 A * 3/1976 Hawk .................... B44D 3/126 401/121
4,023,702 A * 5/1977 McKnight ................ B44D 3/14 220/756
4,025,205 A * 5/1977 Hawk .................... B44D 3/126 401/121
4,069,893 A * 1/1978 Blackstone ............... E06C 7/44 182/200

(Continued)

FOREIGN PATENT DOCUMENTS

DE 9318300 U1 * 4/1994
EP 2452828 A1 * 5/2012 ............ B44D 3/126

(Continued)

*Primary Examiner* — Stanton L Krycinski
(74) *Attorney, Agent, or Firm* — Craig J. Lervick; Larkin Hoffman Daly & Lindgren, Ltd.

(57) ABSTRACT

A paint workstation includes several integral structures characteristics that provide convenient resources for painting projects, with such structures supported by adjustable legs and configured to hold several necessary tools. A main body of the workstation has compartments specifically configured to contain paint cans, paint brushes, tape, plastic wrap, etc. Further an integral paint roller tray is formed as part of the main body, and a removable paint roller holder is configured to be attached to the main body at a position adjacent the roller tray. The roller holder is configured to hold a paint roller in a position that is partially within the paint roller tray, but not to sit in a bottom reservoir portion of the tray. Additional accessories include attachable trays and components that allow the workstation to be configured in a manner that is very flexible and tailored to the painter's needs.

17 Claims, 10 Drawing Sheets

(56) References Cited

U.S. PATENT DOCUMENTS 4,880,248 A * 11/1989 Elmer ........................ B62B 1/10 280/47.35
4,890,353 A * 1/1990 Shannon ................ B44D 3/123 248/909
4,993,726 A * 2/1991 Schumacher ............ B44D 3/14 280/47.35
4,998,696 A * 3/1991 Desjardins ............. B44D 3/162 248/176.1
5,060,580 A * 10/1991 Shaw ..................... A47B 37/04 108/33
5,082,301 A * 1/1992 Schumacher ............ B44D 3/00 280/38
5,190,303 A * 3/1993 Schumacher ............ B44D 3/00 108/14
5,217,193 A * 6/1993 Drucker .................. E04D 15/00 248/154
5,366,071 A * 11/1994 Laszlo ................... A01K 97/26 206/315.11
5,507,364 A * 4/1996 Spevak ..................... E06C 7/44 182/200
5,556,181 A * 9/1996 Bertrand .................. A47B 9/00 108/14
5,860,367 A * 1/1999 Riegel ...................... A47B 3/12 108/26
5,913,782 A * 6/1999 Monaco .................... E04G 3/26 52/126.1
6,164,212 A * 12/2000 Haggard ................ A47B 43/00 108/115
6,543,733 B1 * 4/2003 Pennington .......... A47B 3/0912 248/176.1
6,637,350 B2 * 10/2003 McKsymick .......... A47B 21/00 108/90
6,662,732 B2 * 12/2003 Birsel .................... A47B 21/00 108/26
7,516,704 B2 * 4/2009 Snider .................... B44D 3/126 312/258
7,520,396 B1 * 4/2009 Harris ...................... B44D 3/14 211/85.18
7,527,164 B1 * 5/2009 Reichborn ............... B44D 3/14 220/570
7,575,261 B2 * 8/2009 Gagne ...................... B44D 3/14 220/759
7,779,762 B2 * 8/2010 Sackman ............. A47B 13/081 108/38
7,854,341 B2 * 12/2010 Martin ................... B44D 3/126 220/4.27
8,016,075 B2 * 9/2011 Pohl .......................... E06C 7/14 220/520
8,245,650 B1 * 8/2012 McKsymick .......... A47B 37/02 108/26
8,366,061 B2 * 2/2013 Rose ...................... B44D 3/126 220/570
8,382,056 B2 * 2/2013 Le Masurier ........... E06C 7/426 248/346.03
8,490,551 B1 * 7/2013 Wagner ...................... F25D 3/06 312/229
8,657,144 B2 * 2/2014 Kells ...................... B44D 3/125 220/636
8,857,346 B2 * 10/2014 Khanjian ............... A47B 3/087 108/26
8,887,940 B2 * 11/2014 Kiceniuk, Jr. ......... B44D 3/121 248/339
8,991,639 B2 * 3/2015 Kells ........................ B65D 1/36 220/570
9,175,921 B2 * 11/2015 Hughes ................... F41A 23/16
9,247,807 B1 * 2/2016 Sanchez ................. A47B 37/04
9,403,637 B2 * 8/2016 Aronoff ................. B44D 3/126
9,579,925 B1 * 2/2017 Cooper .................. B44D 3/123
9,713,374 B1 * 7/2017 Page ....................... B25H 3/022
10,117,513 B1 * 11/2018 Tolentino .............. A47B 31/04
10,258,143 B1 * 4/2019 Kenyon ................... A47B 3/10
10,363,773 B2 * 7/2019 Pippus ................... B44D 3/126
10,632,785 B2 * 4/2020 Tuzi ....................... B44D 3/126
11,198,320 B2 * 12/2021 Robertson .............. B44D 3/126
11,383,549 B2 * 7/2022 Turner ................... B44D 3/123
2002/0056967 A1 * 5/2002 Carrillo ................... B62B 3/008 280/47.35
2003/0006156 A1 * 1/2003 McCracken ........... B44D 3/128 206/562
2003/0126711 A1 * 7/2003 Korenevsky ........... B44D 3/123 15/144.3
2004/0226954 A1 * 11/2004 Pasinski ................. B44D 3/126 220/570
2005/0274575 A1 * 12/2005 Gibson ..................... E06C 7/14 182/129
2006/0066064 A1 * 3/2006 Hardy ...................... B44D 3/14 280/79.2
2008/0029520 A1 * 2/2008 Hucks .................... B44D 3/126 220/570
2008/0121549 A1 * 5/2008 Bartok ................... B44D 3/126 206/557
2009/0019659 A1 * 1/2009 Hill ........................ B44D 3/123 220/570
2009/0050632 A1 * 2/2009 Martin ................... B44D 3/126 220/309.1
2009/0064443 A1 * 3/2009 Lajoie ................. B05C 17/0245 15/257.06
2009/0285997 A1 * 11/2009 Bartok ................... B44D 3/123 220/736
2013/0068639 A1 * 3/2013 Plouffe .................... B44D 3/12 206/223
2015/0151566 A1 * 6/2015 Abuzarifah ......... B05C 17/0245 220/570
2015/0336422 A1 * 11/2015 Tuzi ....................... B44D 3/126 220/570
2018/0117956 A1 * 5/2018 Tuzi ....................... B44D 3/123
2019/0023062 A1 * 1/2019 Hamilton ................. B44D 3/12
2019/0389242 A1 * 12/2019 Wager .................... B44D 3/126
2021/0252906 A1 * 8/2021 Machner ................ B44D 3/128
2022/0258529 A1 * 8/2022 Alvarez ................. A46B 17/06
2022/0267070 A1 * 8/2022 Sperlik .................. B44D 3/125
2022/0363301 A1 * 11/2022 Sholeen ................... B44D 3/04
2023/0241911 A1 * 8/2023 Torres .................... B44D 3/126 220/697

FOREIGN PATENT DOCUMENTS

GB 2485983 A * 6/2012 ............... B44D 3/12
GB 2558526 A * 7/2018 ............. B44D 3/126
WO WO-2013034662 A2 * 3/2013 ............. B44D 3/006

* cited by examiner

PAINT WORKSTATION HAVING COOPERATING PAINT ROLLER AND RELATED ACCESSORIES

BACKGROUND

Professional painters, handymen/handywomen, and homeowners often struggle with paint trays, paint holders, and other accessories during projects. Generally, existing tools do not provide efficiency during painting projects/jobs, and there is considerable room for improvement. In many instances, it is necessary to coordinate the use of paint trays, paint cans, rollers, brushes, and other tools in a manner which is efficient and convenient. In addition, the placement of these tools/supplies can occasionally be challenging, as uneven work environments are commonly encountered. As one example, painting of stairways or other uneven structures can often be challenging.

While tools and resources exist to hold many of these components, they often do not cooperate very well nor are they very flexible. As an example, many tools or components have either built in or supported paint trays, but often do not provide resources to easily hold a paint roller in a convenient position. In many situations, the roller itself will slide to the bottom portion of the paint tray, thus sitting in the paint reservoir and consequently soaking up undesirable amounts of paint. In addition, existing tools or components do not include resources to hold or position rollers in alternative compartments, or conveniently position additional components that are often used, such as related brushes, paint cans, plastic wrap, rollers, tape, masking paper, etc. Further, it is typically desirable to customize these resources so that each user's desired configurations can be achieved.

SUMMARY

In order to provide a flexible and usable resource for those carrying out painting projects, a configurable paint workstation is provided which allows a user to easily position and retain all necessary tools. In addition, many accessories are provided which further allows for different configurations and additional resources.

The paint workstation described and illustrated below includes a main body which is configured to have compartments or structures which will accommodate the storage of paint, brushes, and other tools which may be needed. The main tray further includes an integral roller tray, which is configured in a well-known manner, having a sloped portion and a lower reservoir portion configured to allow a user to dip a roller in the paint contained in the reservoir portion and then distribute the paint across the surface of the roller as it is moved up and down the sloped portion. The main body further includes compartments to hold paint containers, which may include either the well-known cylindrical paint cans or more recent square or rectangular paint containers. One approach to storing both styles of paint containers is to have a rectangular or square compartment with a cylindrical bottom section extending below a set of square edge corners. This will allow cylindrical cans to be inserted in the cylindrical bottom portions, while square containers are held in the square corner portions. In addition, the main body is supported by a number of adjustable and removable legs, thereby allowing positioning of the main body (and integral paint tray) at a desired height. This also allows the paint workstation to be placed on uneven or irregular work areas, while supporting the main body horizontally to facilitate painting projects. Further structures are incorporated into the main body to hold other tools, such as brushes, hand tools, tape, etc.

In addition to the components mentioned above, several accessories are specifically configured to interact with the main body. These include a detachable roller holder, which can be coupled to the main body at a location adjacent to the roller tray. This roller holder specifically includes structures which will interact with portions of a paint roller, and hold it in an appropriate position where the roller structure is held on the sloped region, and does not sit in the bottom paint reservoir. Various embodiments of the roller holder structure exist, which can accommodate a standard roller, or a specifically configured roller which is designed to have further advantages and to better cooperate with the removable roller holder. Additionally, multiple detachable trays are provided which allow for holding of additional rollers, other accessories, plastic wrap, or other tools as may be necessary. With the roller holder being removable, the overall workstation is easily configurable to accommodate the specific needs and desires of the user.

In addition to the features outlined above, the paint workstation may include additional conversion accessories, which allow the paint tray to be used for alternative purposes. As one example, a party platter is configured to be placed on top or over the main body, having specific compartments configured to hold drinks, snacks, food items, etc.

Furthermore, specific paint brushes and paint rollers are designed and configured to cooperate with various features on the paint workstation. Based upon the angles and structures of the paint rollers themselves, not only do these tools easily cooperate with the main body and/or accessories, they also provide additional features which are beneficial to those utilizing the brushes and/or rollers.

BRIEF DESCRIPTION OF THE DRAWINGS

Further features and advantages of the paint workstation are set forth in the description set forth below, in conjunction with the drawings, in which.

DESCRIPTION

As further outlined below, the embodiments of the paint workstation described herein provide several advantages and features which will be appealing to those carrying out paint projects. While the several details of these embodiments are discussed below and highlighted in the attached figures, clearly certain variations are possible.

Figure 1:
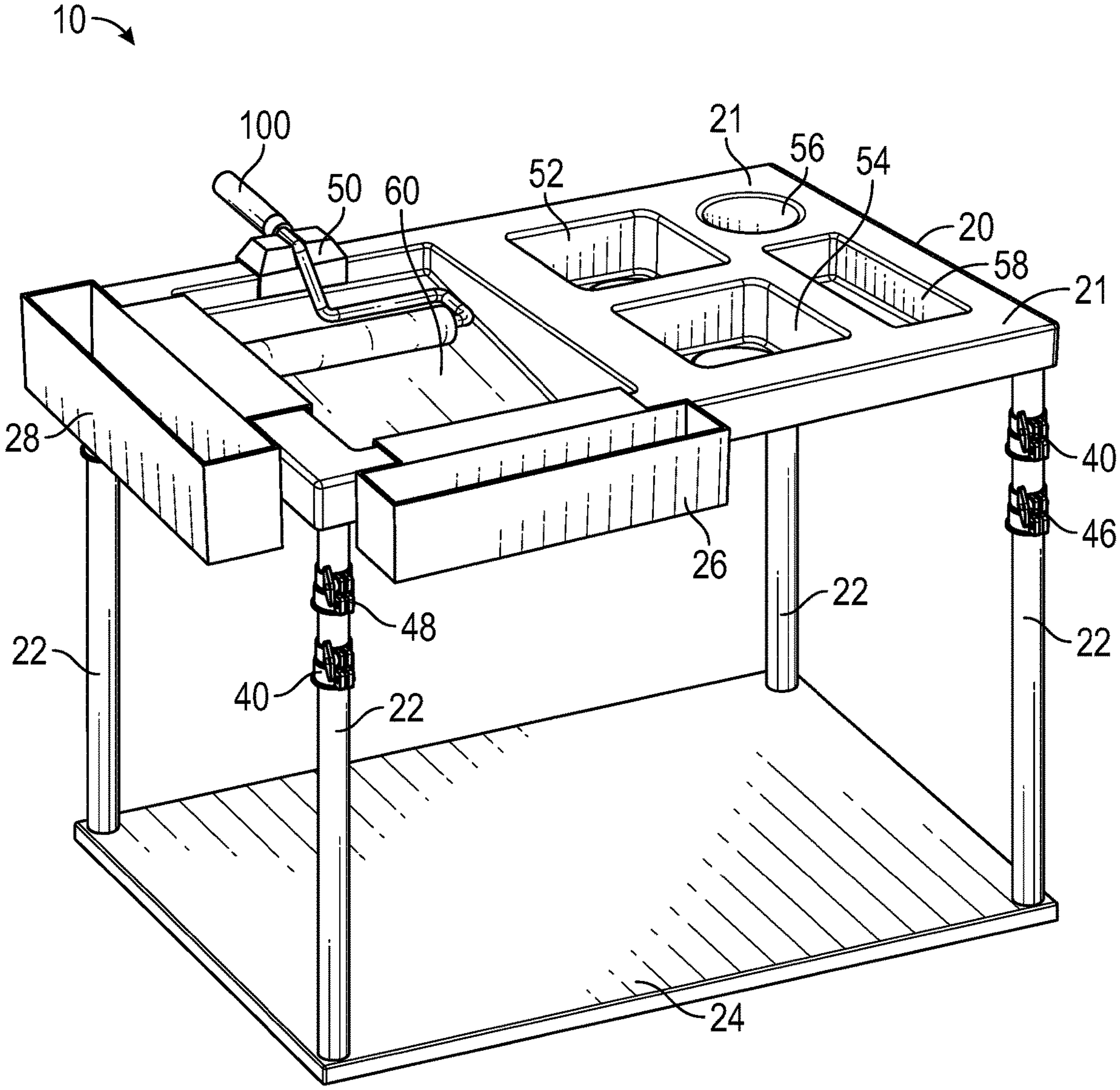
FIG. 1 is a perspective view of one embodiment of the paint workstation.
Figure 2:
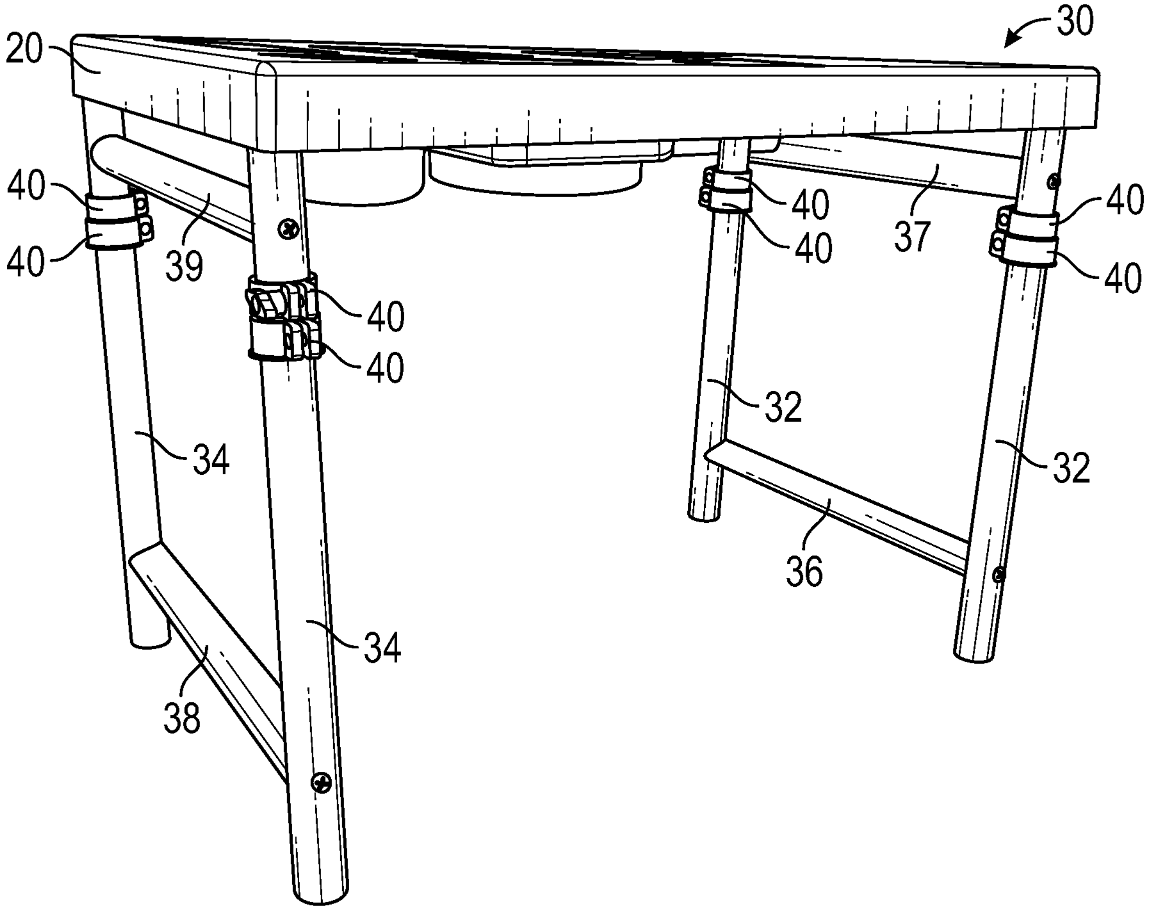
FIG. 2 is a front-side perspective view of another embodiment of the paint workstation.

Referring now to FIG. 1, a perspective view of one embodiment of the paint workstation 10 is illustrated. In this embodiment, paint workstation 10 includes a main body 20, a plurality of supporting legs 22, a connecting base 24, a first attachable tray 26, a second attachable tray 28, and a detachable roller holder attachment 50. A second embodiment of a paint workstation 30 is generally illustrated in FIG. 2. In this second embodiment, main body 20 remains the same while an alternate version of a first adjustable leg assembly 32 and a second adjustable leg assembly 34 are illustrated in further detail. In this second embodiment, first adjustable leg assembly 32 and second adjustable leg assembly 34 both have supporting cross members 36, 37, 38 and 39, respectively, which provide additional support for paint tray 20 and can more easily be adjusted independently. In each embodiment, legs 22, 32 and 34 include a releasable extension assemblies 40 to allow adjustments in length. These extension assemblies 40 include release levers 42, or release knobs which allow related nested leg segments 44 to be easily extended.

Figure 3A:
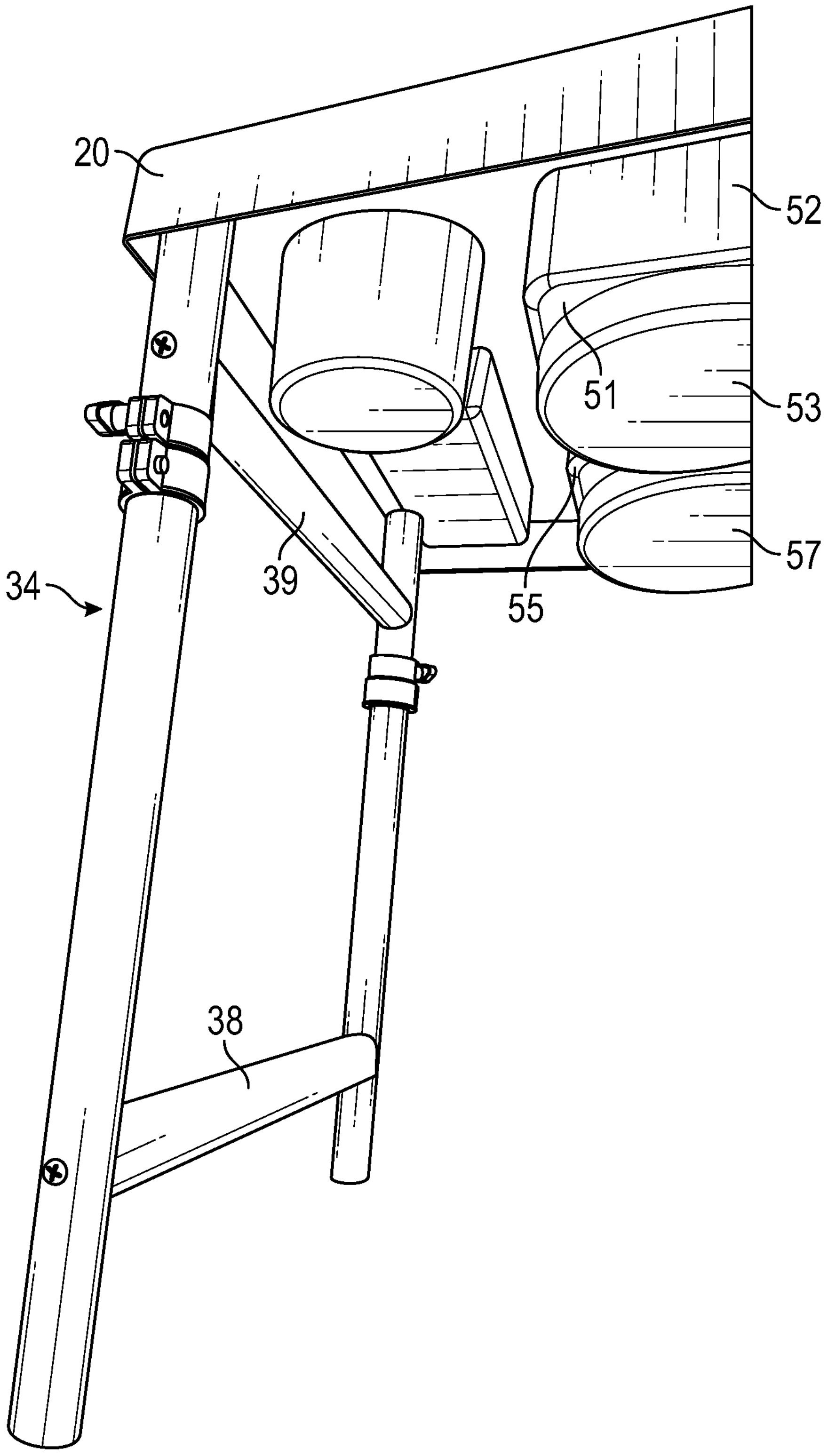
FIGS. 3A & 3B show the right and left leg assemblies, respectively, of the paint workstation shown in FIG. 2.
Figure 3B:
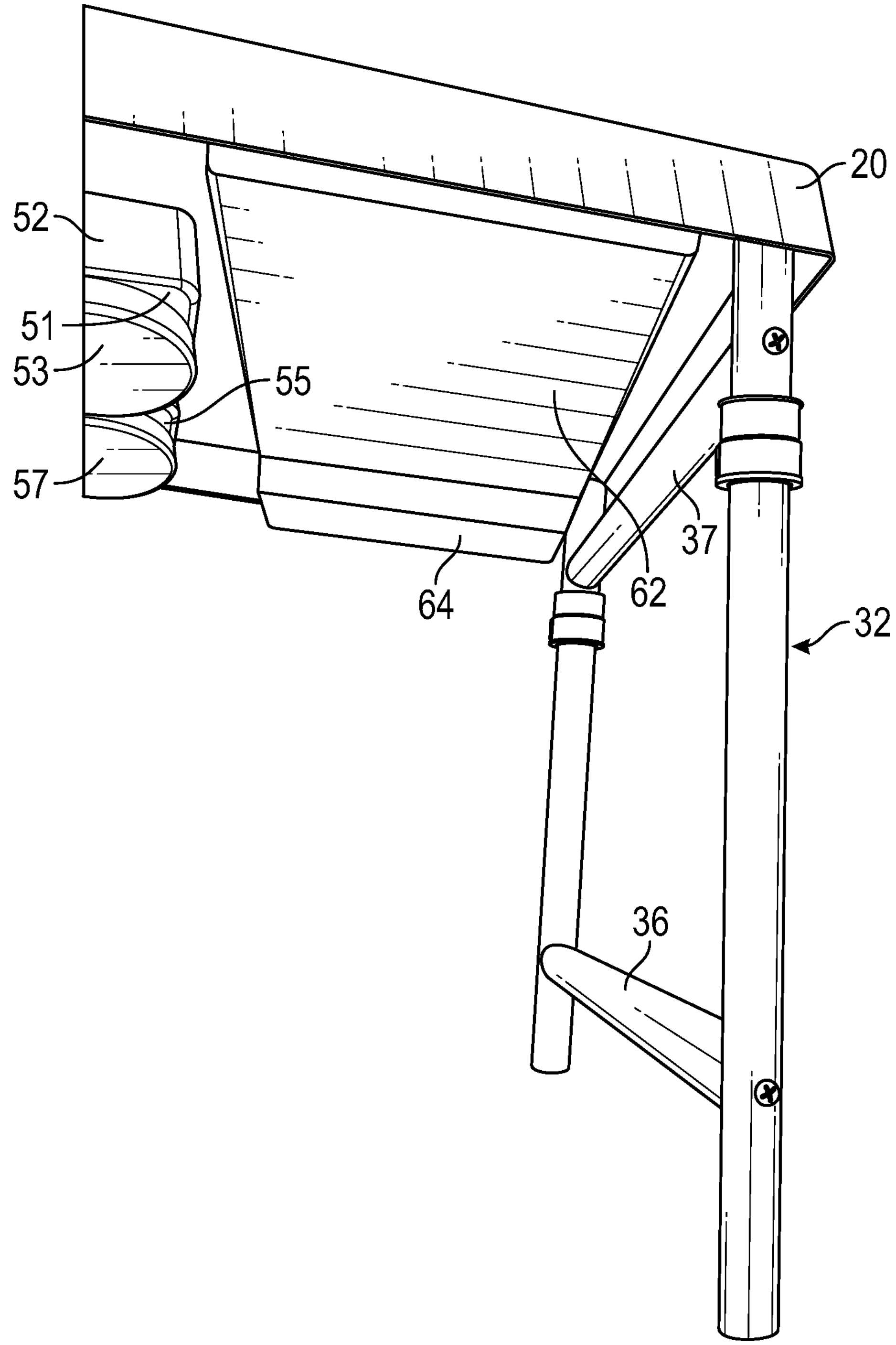

FIGS. 3A and 3B present close-up views of leg members 32 and 34, respectively. In this embodiment, the stability created by cross members 36, 37, 38 and 39 provide structural integrity to the workstation 10, and help to stabilize all components. In the embodiment of FIG. 1, connecting base 24 will provide certain levels of stability, although it is contemplated that this component is removable.

Referring again to FIG. 1, main body 20 includes a top surface 21, and a number of compartments that extend downwardly therefrom. These compartments include a pair of paint handling compartments 52, 54, along with a cylindrical compartment 56 and a rectangular compartment 58. Paint containing compartments 52 and 54 both include a bottom structure to contain both cylindrical paint cans and square paint containers. FIGS. 3A and 3B show an underside view of these structures, with first compartment 52 having a bottom structure with a cylindrical section 53 and square corner ledges 51. Second paint compartment 54 has a similar configuration, including a cylindrical section 57 and square corner ledges 55. Additionally, a portion of main body 20 is configured to resemble a well-recognized paint roller tray 60, which includes a sloped lower wall 62 and a bottom reservoir 64. As will be appreciated by those familiar with painting tools, this paint roller tray 60 easily allows users to selectively apply amounts of paint to a paint roller and easily distribute this across the roller by using the sloped wall 62. A bottom view of paint roller tray 60 is shown in FIG. 3B.

In the embodiment illustrated in FIG. 1, a cooperating paint roller 100 is illustrated. As will be further discussed below, paint roller 100 is configured to cooperate with roller holder 50 so that roller 100 is held in the illustrated intermediate position (with a roller pad 102 sitting upon the sloped wall and not allowed to move into the bottom reservoir 64).

Figure 4:
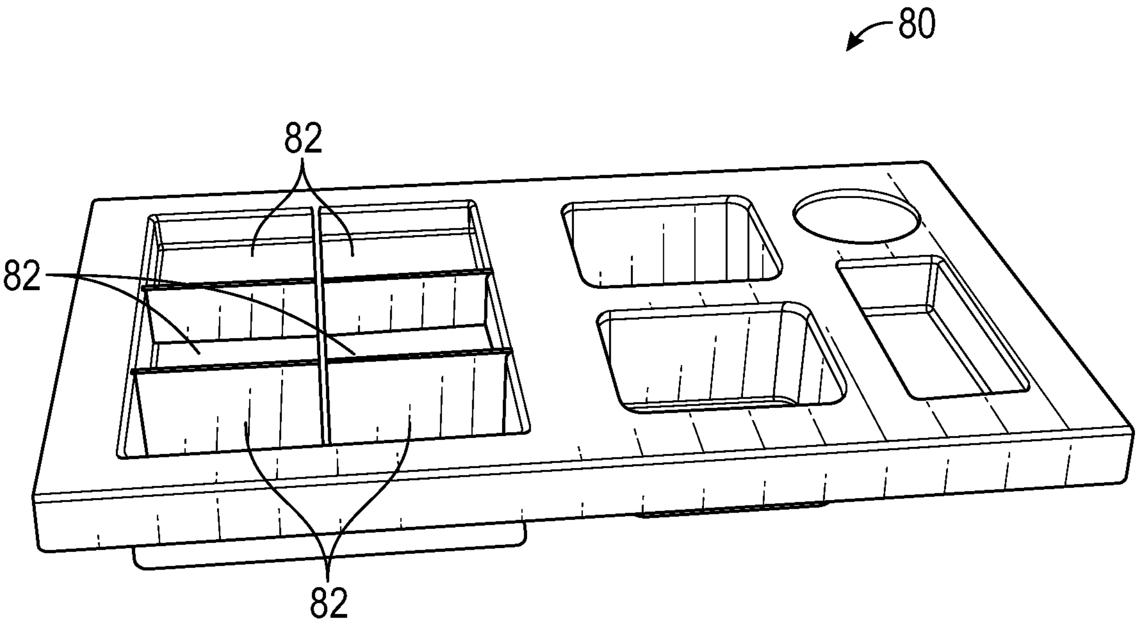
FIG. 4 illustrates an embodiment of an accessory used to convert the paint workstation for an alternative use.

In certain circumstances, it is desired to use a workspace to host gatherings and/or parties, and workstation 30 provides a valuable tool. As shown in FIG. 4, a party tray accessory 80 provides the ability to convert workstation 30 into a serving tray capable of providing snacks to party attendees. Party tray accessory 80 is configured to nest on top of main body 20, and has a plurality of compartments configured to serve snacks. As an example, in an area that is configured to be directly above paint roller tray 60, a plurality of rectangular compartments 82 are formed. Additional square snack compartments 84 are formed in the middle of party tray 80. Additional compartments 86 and 88 are formed on a side of party tray 80 to further provide snack compartments.

Figure 5:
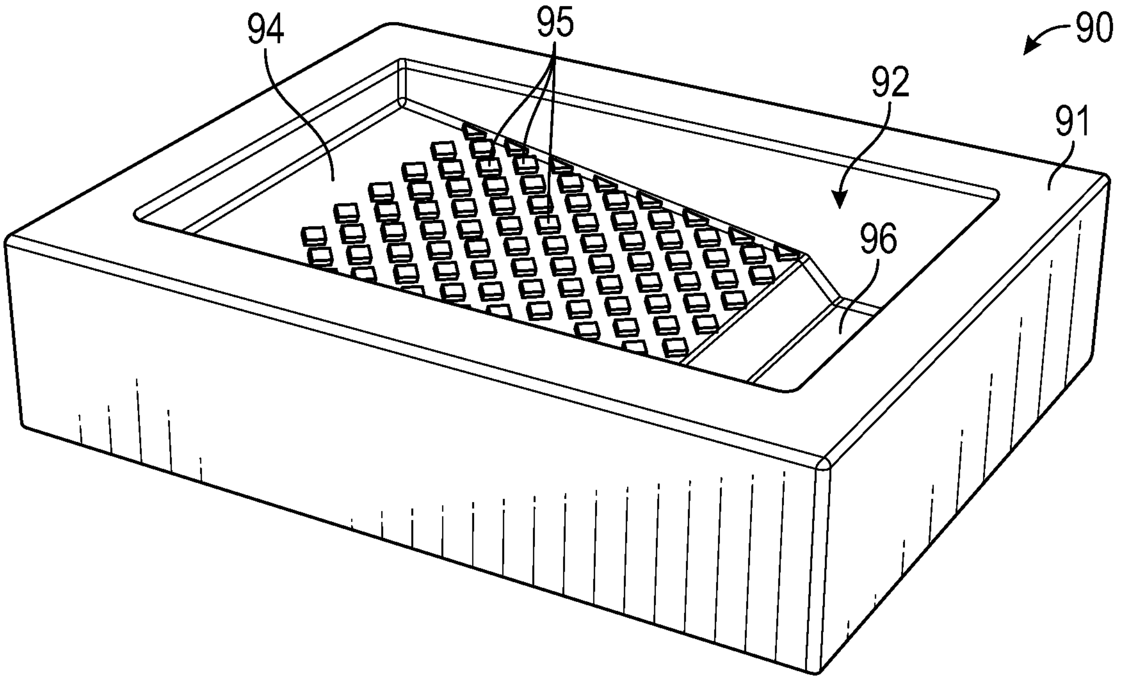
FIG. 5 presents an accessory for providing additionally paint trays.

Turning now to FIG. 5, a tray mold 90 is generally illustrated. Tray mold 90 is configured to have a tray forming section 92, which includes a structure that resembles paint roller tray 60 discussed above. Forming section 92 extends downwardly from a top surface 91 and has a sloped section 94 and a reservoir section 96. In this embodiment, sloped section 94 includes a number of surface nubs 95 to form a textured surface. As will be appreciated, several surface textures are possible.

It is well recognized that disposable tray inserts are often used during painting projects. These disposable tray inserts are configured to be placed within the bottom of a roller tray (such as roller tray 60 discussed above), and then disposed of after a few uses. While these disposable tray inserts can be purchased, they can be reasonably formed using aluminum foil, or similar formable materials. To simplify this process, tray mold 90 is included as an accessory to workstation 10, thereby allowing the user to more easily and cost effectively create a disposable tray inserts when needed.

While tray mold 90 is illustrated in FIG. 5 as a stand-alone component, it is contemplated that this auxiliary tray could be coupled to main body 20 and thus allow for two painting trays to be used simultaneously. In this application, tray mold 90 would be coupled with portions of main body 20 and prove another resource for painting projects. Although there are alternatives possible, it is contemplated that tray mold 90 (i.e. an auxiliary roller tray) would be positioned above cylindrical compartment 56 and rectangular compartment 58. Naturally, this situation would also allow for the instant formation and use of a disposable tray insert, as this would provide considerable flexibility for the user. It is also contemplated that tray mold 90 could be removably coupled to a portion of connecting base 24 and could be used or stored when in this position. Also, should this require that paint handling compartments 52 and 54 be covered, it is contemplated that similar structures could be formed in connecting base 24, thus continuing to provide an accommodation for holding paint cans/containers.

Figure 6:
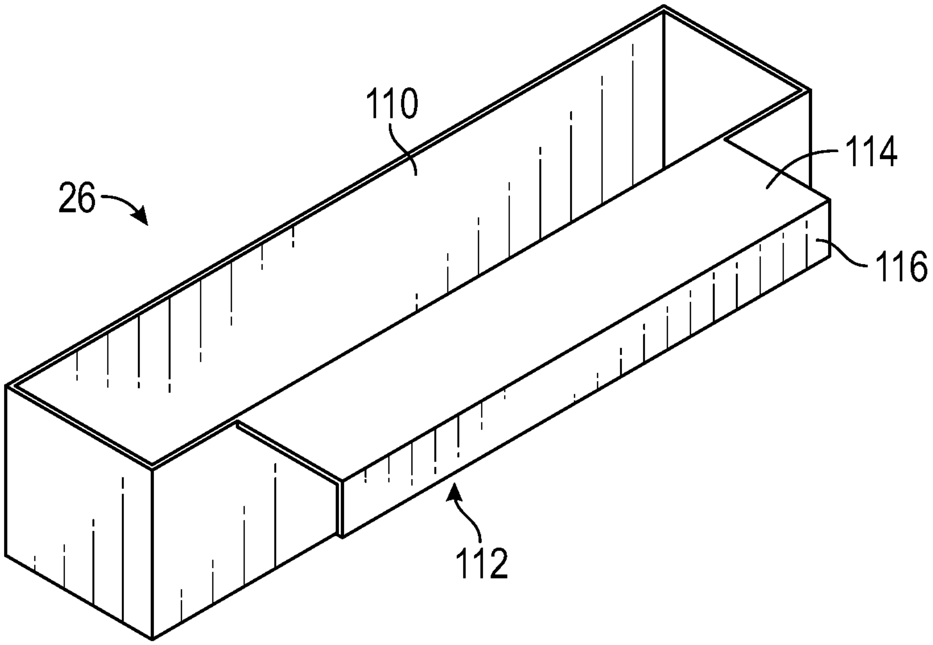
FIG. 6 is a perspective view of a roller tray accessory.
Figure 7A:
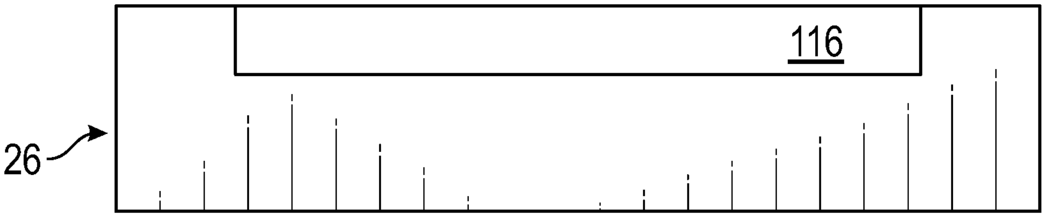
FIG. 7A is a front view of the roller tray accessory.
Figure 7B:
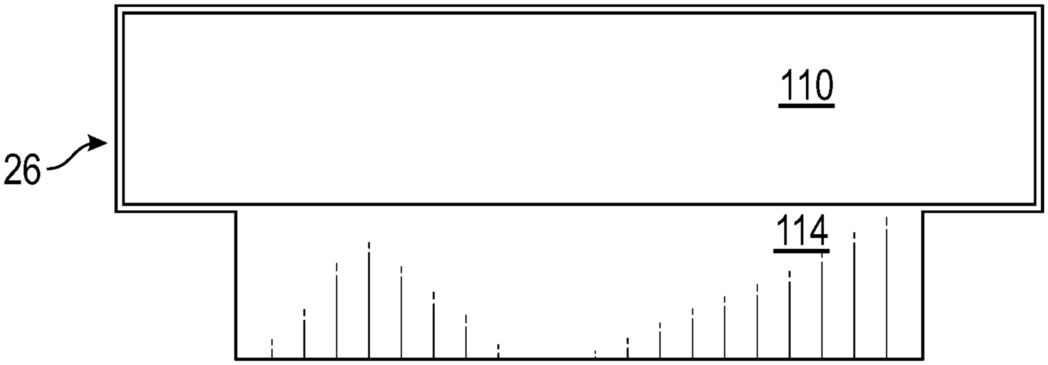
FIG. 7B is a top view of the roller tray accessory.
Figure 7C:
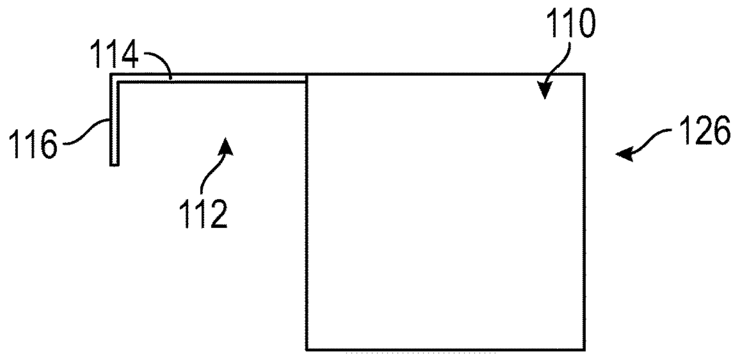
FIG. 7C is a side view of the roller tray accessory.

As generally discussed above, the workstation illustrated in FIG. 1 includes a first attachable tray 26 and a second attachable tray 28. FIG. 6 illustrates a perspective view of first attachable tray 26, while FIGS. 7A through 7C illustrate front top and side views, respectively. As illustrated in these figures, first attachable tray 26 includes a rectangular compartment 110, along with an attachment flange 112. Attachment flange 112 in this embodiment includes a lateral portion 114, and a downward lip 116. As will be appreciated, attachment flange portion 112 is specifically configured to be coupled to an edge portion of main body 20, as illustrated in FIG. 1. Flange portion 112 can be easily configured to attach as illustrated in FIG. 1, but may also be configured to be coupled with other portions of main body 20, which may be adjacent to rectangular compartment 58, square paint handling compartments 52, 54 and cylindrical compartment 56. Further configurations are obviously possible. Most significantly, these attachable tray members can be easily attached and removed, thus providing additional storage spaces for the user. It is anticipated that these attachable trays will have compartments 110 specifically configured to hold items such as brushes, plastic wrap, auxiliary or additional rollers, tape, or other components which may be necessary to carry out painting projects.

Figure 8:
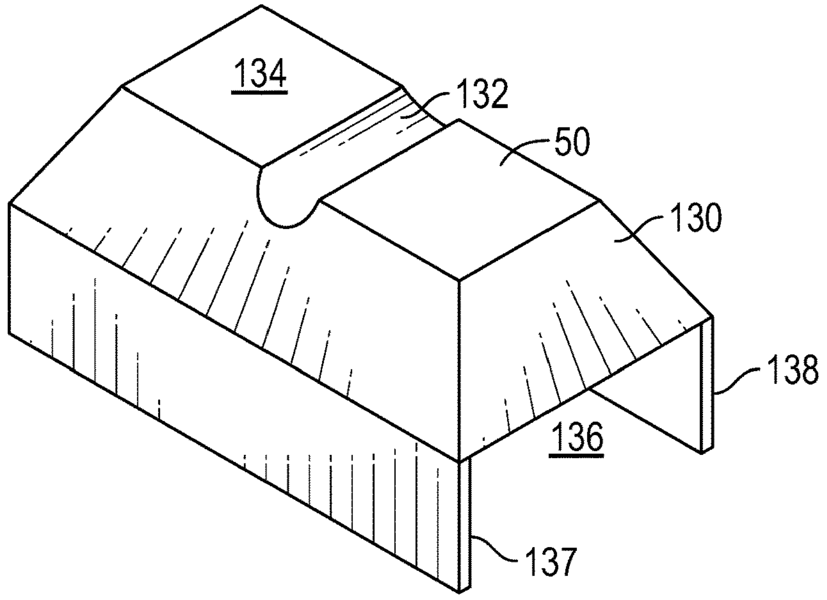
FIG. 8 presents a perspective view of an attachable roller holder accessory.
Figure 9:
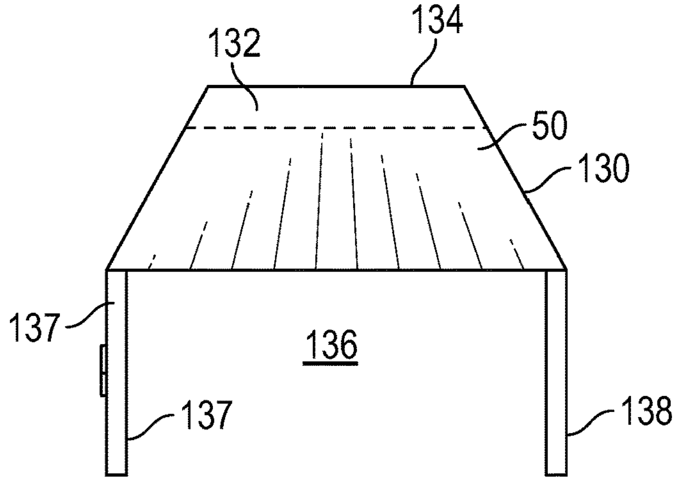
FIG. 9 is a side view of the attachable roller holder accessory shown in FIG. 8.

Referring again to FIG. 1, roller holder 50 is generally illustrated as attached to the side of main body 20 adjacent paint tray 60. As generally suggested above, roller holder 50 is a removable accessory that is specifically configured to retain a paint roller 100 in a desired position. Referring now to FIGS. 8-12, further details regarding roller holder 50 and paint roller 100 are better illustrated. Turning now to FIG. 8, a perspective view of roller holder 50 is generally illustrated, while FIG. 9 presents a side view thereof. As generally illustrated in both FIGS. 8 and 9, roller holder 50 includes an upward extension 130, having a cylindrical recess 132 situated within an upper surface 134. A lower channel 136 is formed on a bottom side thereof which is situated between lower extension walls 137 and 138. As shown in FIG. 1, cylindrical recess 132 is configured to receive a portion of paint roller 100. In this manner, paint roller 100 can be retained in a desired position.

Figure 10:
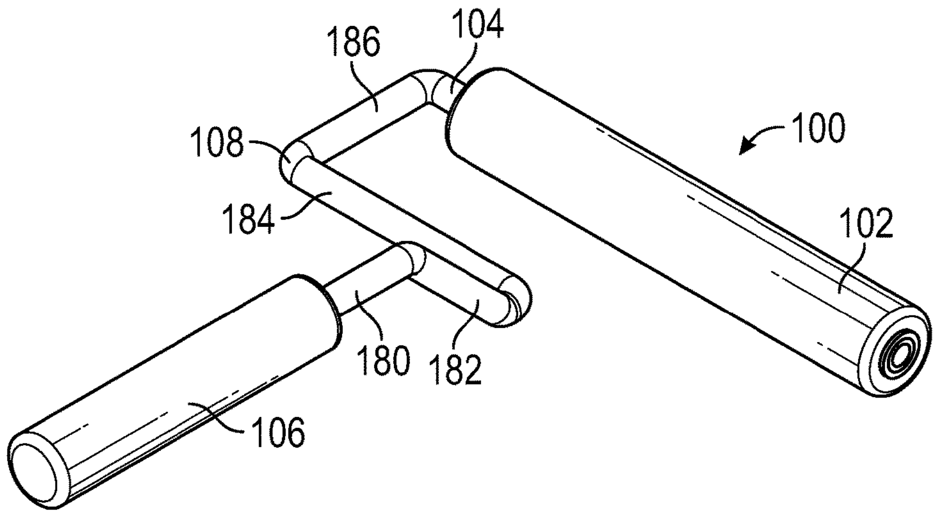
FIG. 10 is a perspective view of a first customized roller which cooperates with the roller holder accessory of FIG. 8.
Figure 11:
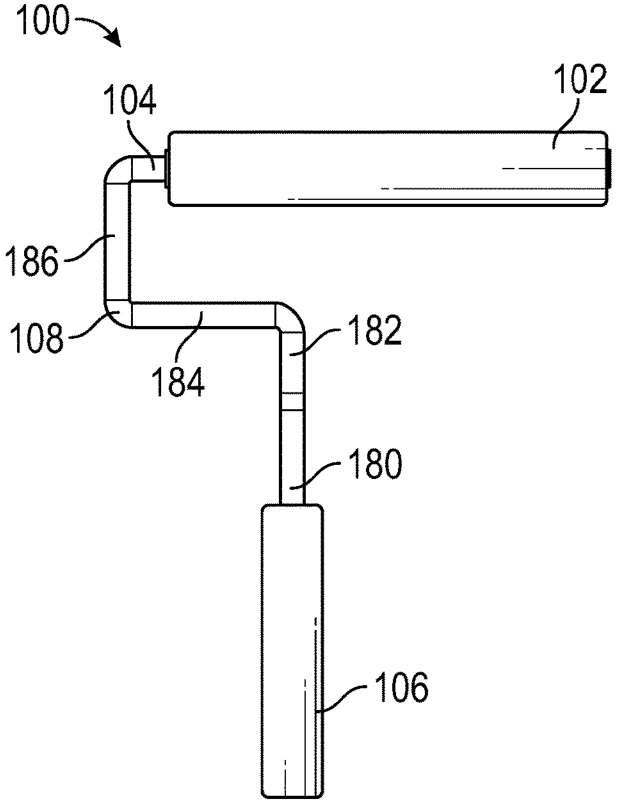
FIG. 11 is a front view of the customized roller of FIG. 10.
Figure 12:
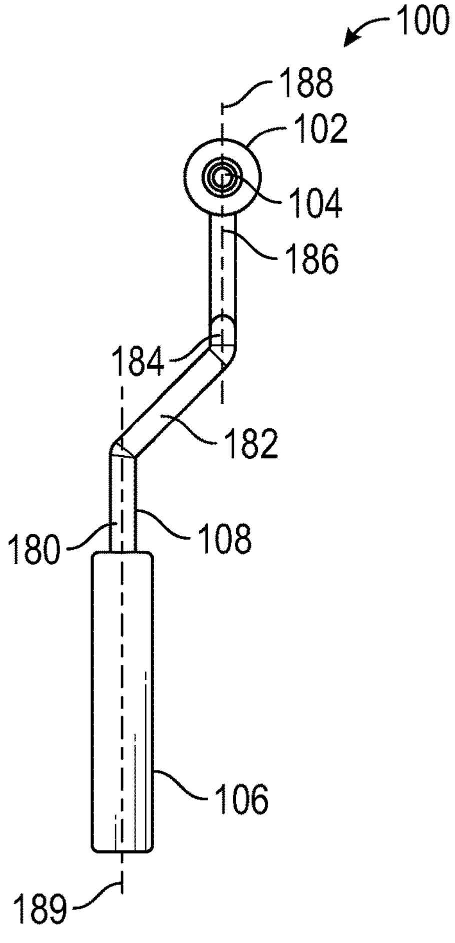
FIG. 12 presents a side view of the customized roller of FIG. 10

In this particular embodiment, it is contemplated that roller holder 50 is configured so that cylindrical recess 132 is generally horizontal when attached to main body 20. In an effort to allow paint roller 100 to be held in its desired position, the present embodiment contemplates the use of a specialized roller 100 which is generally illustrated in FIGS. 10-12. Roller 100 is configured to support a cylindrical roller pad 102 in a manner which is well recognized by those skilled in the art. In order to achieve this support, a horizontal frame member 104 is positioned at one end of paint roller 100, and is configured to be situated within paint roller 102 and coaxially aligned therewith. Further, paint roller 100 includes a handle 106, and a multi-angled frame portion 108 extending between handle 106 and horizontal frame member 104. As illustrated in the various figures, frame member 108 includes a main extension portion 180 which extends immediately out of the handle 106 and which is coaxially aligned therewith. Frame member 108 also includes a slope section 182 which extends between main extension portion 180 and a cross member 184. Cross member 184 is generally parallel with roller support member 104, and is situated in a roller plane 188 (which is best illustrated in FIG. 12). As also illustrated in FIG. 12, handle 106 and initial extension portion 180 are both positioned in a handle plane 189. In this particular embodiment, roller plane 188 and handle plane 189 are parallel to one another, while being spaced apart. As will be appreciated, this spacing allows for roller 102 to be supported by a portion of paint roller tray 60, while handle extension 180 is positioned within roller holder recess 132.

Figure 13:
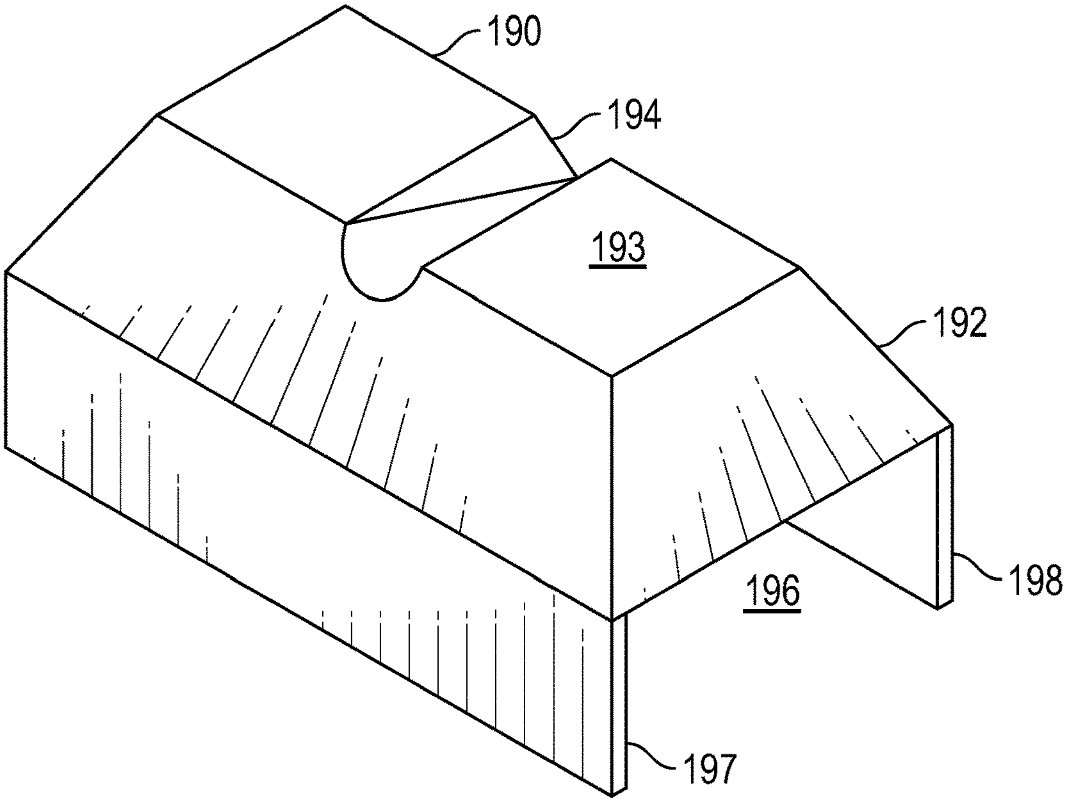
FIG. 13 is perspective view of a second attachable roller holder accessory.
Figure 14:
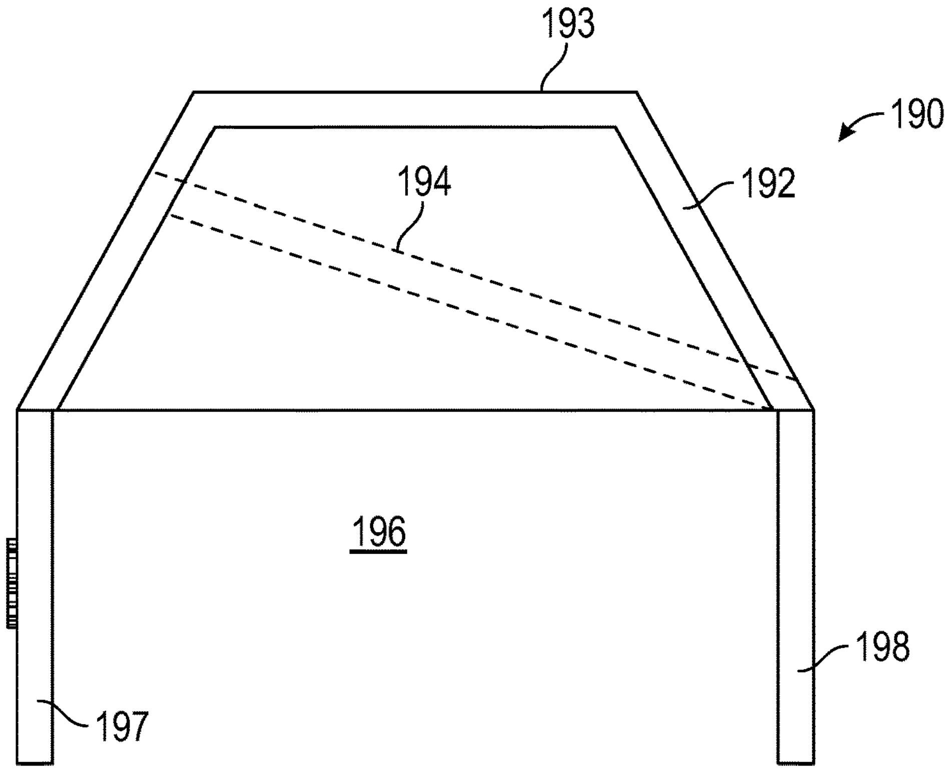
FIG. 14 is a side view of the second attachable roller holder assembly.
Figure 15:
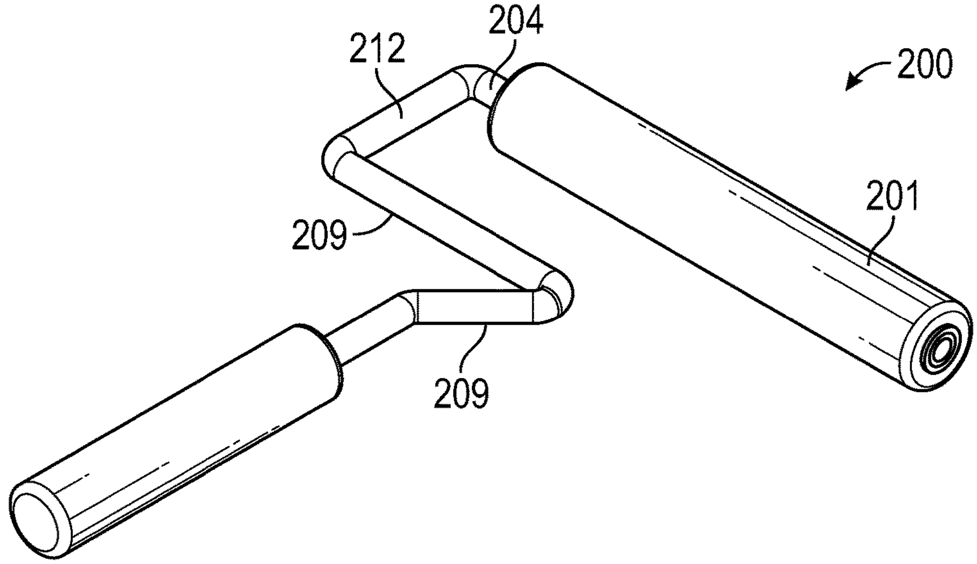
FIG. 15 shows a second customized roller which cooperates with the roller holder accessory of FIG. 13.
Figure 16:
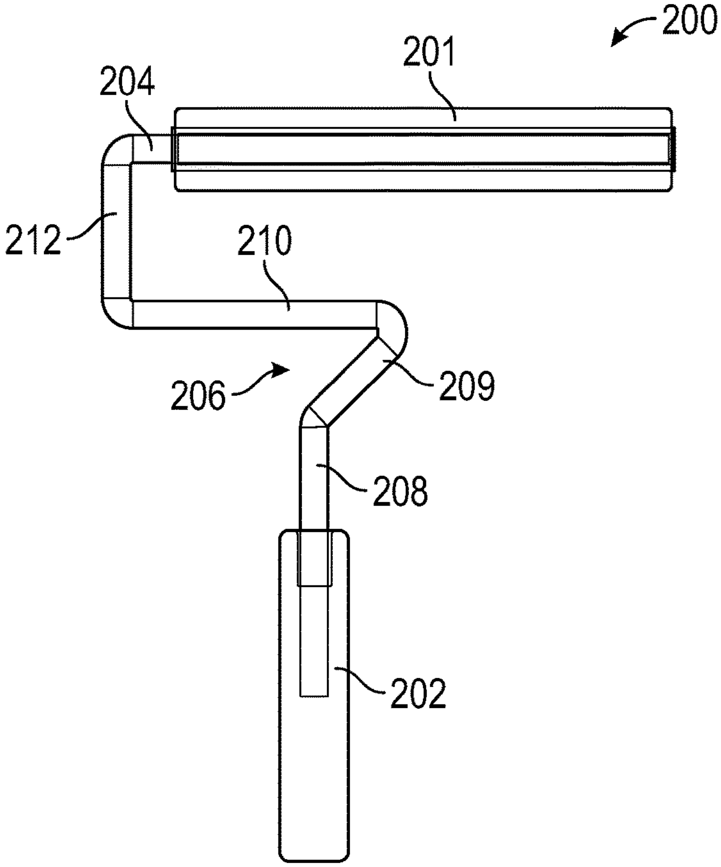
FIG. 16 is a front view of the roller shown in FIG. 15.

An alternative embodiment is shown in FIGS. 13-17, which illustrate an alternative roller holder 190 and an alternative roller 200. As illustrated in FIG. 13, roller holder 190 includes an upward extension 192, a sloped cylindrical recess 194 positioned within top surface 193, and which extends downwardly and at an angle (which is best illustrated in FIG. 14). A bottom channel 196 also exists, which is formed from first lower extension 197 and second lower extension 198. Again, lower recess 196 is specifically formed to be positioned on an edge of main body, in a manner similar to first roller holder 50.

Figure 17:
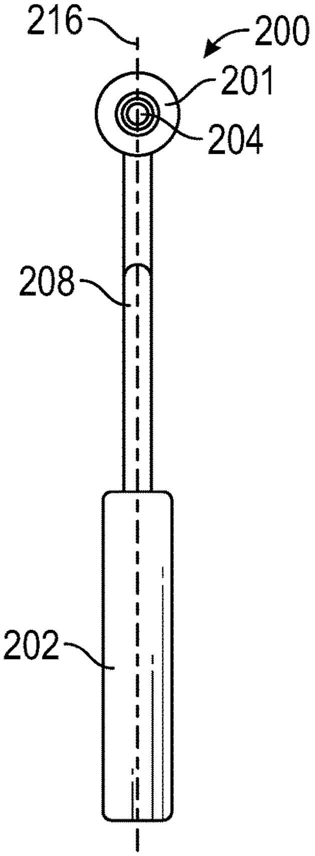
FIG. 17 is a side view of the customized roller shown in FIG. 15.

As second roller holder 190 includes a sloped cylindrical recess 194, roller 200 is specifically configured to be utilized with this particular embodiment. As illustrated, roller 200 has a frame structure which is positioned in a single plane, as best shown in FIG. 17. Here, roller 200 includes a handle portion 202, a roller support member 204 which is configured to support a paint roller 201 in a well-known manner, and which is coaxially aligned therewith. Further, a connecting frame structure 206 exists which includes a handle extension section 208, an angled portion 209, a first lateral portion 210, and a connecting portion 212. As will be appreciated, these each form the necessary structure and connection between handle 202 and roller support member 204. In this particular embodiment, angled portion 209 and handle 202 provide a stopping or holding function, so that when handle extension portion 208 is positioned within recess 194 of second roller holder 190, roller 200 will be held in a desired position.

As best shown in FIG. 17, second embodiment of roller 200 is configured in a manner to have handle 202, and all elements of frame structure 206 (including roller holder 204, handle extension section 208, angled portion 209, first lateral portion 210, and connecting portion 212) situated in a single plane 216. In certain situations, this type of roller may be beneficial to achieve certain functions. In contrast, roller 100 of the first embodiment has the handle portion 106 and the roller holder 104 situated in separate planes. As an alternative painting tool, this configuration is beneficial in other situations as it allows the user to alter the way pressure is applied. Naturally, alternative embodiments are possible which take advantage of the features outlined above, and provide the combination of a useful roller configuration and a roller holder that allows for varied configurations. It should also be recognized that these are easily interchangeable and can be switched during painting operations.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A paint workstation, comprising:

a main body comprising a substantially horizontal a-paint roller tray structure which is configured to be held in a substantially horizontal position during use, a paint can compartment and a plurality of storage compartments, wherein the paint roller tray structure is configured to have a reservoir section and a sloped bottom wall extending upwardly from the reservoir section toward a top surface of the paint roller tray structure, wherein the reservoir section is configured to contain a predetermined amount of paint and wherein the paint can compartment has a dual base structure to accommodate both round and square paint containers, and wherein the plurality of storage compartments have a bottom surface situated below the top surface of the main body, the workstation further comprising at least three independently adjustable legs coupled to a bottom side of the main body and configured to be adjustable between an extended position and a storage position, wherein when in the extended position the legs will support the main body a predetermined distance above a supporting surface and wherein the adjustable legs are further adjustable in length; and a roller holder configured to be removably coupled to an edge of the main body adjacent to the paint roller tray structure, wherein an upper surface of the roller holder has a recess which is lower than the upper surface of the roller holder and extends from a first side to an opposite second side;

wherein the roller holder is further configured to receive a paint roller which has a roller support structure configured to receive a removable cylindrical paint pad, a handle, and a frame configured to connect the roller support and the handle, wherein the roller support is rotatably coupled to a linear portion of the frame thereby allowing the roller support to rotate around the linear portion, and wherein the frame further has a handle extension situated adjacent to and extending from the handle and which is aligned in a plane that it perpendicular to the roller support, and wherein the handle extension is configured to be received within the recess of the roller holder to hold the roller in the roller tray such that the roller is held in contact with the sloped portion and is prevented from sitting within the reservoir.

2. The workstation of claim 1 further comprising an accessory attachment having a storage bin and an attachment structure, with the attachment structure configured to be removable attachable to an edge of the main body.

3. The workstation of claim 2 wherein the storage bin is elongated and configured to store at least a spare roller or a plastic wrap roll.

4. The workstation of claim 1 wherein the legs are further configured to be selectively removed from the main body.

5. The workstation of claim 1 wherein the supporting surface is a stairway and a first one of the legs are configured to be supported by a first step and a second one of the legs are configured to be supported by a second step.

6. The workstation of claim 1 further comprising a removable base assembly coupled to a bottom end of the at least three adjustable legs and configured to rest upon the supporting surface.

7. The workstation of claim 1 wherein the recess of in the roller holder is substantially horizontal when the roller holder is coupled to the main body.

8. A paint workstation to accommodate the needs of a painter, comprising:

a plurality of legs, with each leg being adjustable in length;

a main body removably coupled to and supported by a first end of the plurality of legs when a second end of the plurality of legs are place upon a supporting surface;

wherein the main body is a unitary structure comprising a plurality of storage compartments recessed below a top surface and a paint roller tray also recessed below the top surface, wherein at least one of the plurality of storage compartments are configured to contain a paint container, and wherein the paint roller tray has a reservoir section with a flat bottom and a sloped wall section extending upwardly from the reservoir section toward the top surface, wherein the reservoir section is configured to contain a predetermined amount of paint therein in a manner to substantially cover the flat bottom of the reservoir when the main body is oriented in a substantially horizontal orientation and a portion of the sloped wall section is configured to be free of paint when the predetermined amount is in the reservoir; and a roller holder removably couplable to an edge portion of the main body which is adjacent to the roller tray, the roller holder having a upper surface which sits above the top surface of the main body when coupled thereto, the upper surface of the roller holder having at least one recess therein extending below the upper surface, the roller holder further having a lower channel at a bottom side configured to surround the edge portion of the main body, wherein the recess is configured to receive a portion of a standard paint roller in a manner which causes a handle of the standard paint roller to extend beyond a first side of the recess and contact a sidewall of the roller holder to thereby hold a roller portion of the roller against the sloped portion of the paint roller tray and to prevent the roller portion from sitting within the reservoir section.

9. The workstation of claim 8 further comprising an accessory attachment having a storage bin and an attachment structure, with the attachment structure having a channel configured to surround an edge of the main body.

10. The workstation of claim 9 wherein the storage bin is elongated and configured to store at least a spare roller or a plastic wrap roll.

11. The workstation of claim 8 wherein the compartment configured to store paint has a dual base configuration to allow cylindrical paint cans or rectangular paint containers to be held therein.

12. The workstation of claim 8 wherein the supporting surface is a stairway and a first one of the legs are configured to be supported by a first step and a second one of the legs are configured to be supported by a second step.

13. The workstation of claim 8 further comprising a removable base assembly coupled to a bottom end of the plurality of legs and configured to rest upon the supporting surface.

14. The workstation of claim 8 wherein the recess is substantially horizontal when the roller holder is coupled to the main body.

15. A paint workstation to accommodate the needs of a painter, comprising:

a plurality of legs, with each leg being adjustable in length;

a main body removably coupled to and supported by a first end of the plurality of legs when a second end of the plurality of legs are place upon a supporting surface;

wherein the main body is a unitary structure comprising a plurality of storage compartments recessed below a top surface and a paint roller tray also recessed below the top surface, wherein at least one of the plurality of storage compartments are configured to contain a paint container, and wherein the paint roller tray has a reservoir section with a flat bottom and a sloped wall section extending upwardly from the reservoir section toward the top surface, wherein the reservoir section is configured to contain a predetermined amount of paint therein in a manner to substantially cover the flat bottom of the reservoir when the main body is oriented in a substantially horizontal orientation;

a roller holder removably couplable to an edge portion of the main body which is adjacent to the roller tray, the roller holder having a upper surface which sits above the top surface of the main body when coupled thereto, the upper surface of the roller holder having at least one recess therein extending below the upper surface, the roller holder further having a lower channel at a bottom side configured to surround the edge portion of the main body, wherein the recess is substantially horizontal when the roller holder is coupled to the main body and is configured to receive a portion of a paint roller in a manner which causes a handle of the roller to extend beyond a first side of the recess and contact a sidewall of the roller holder to thereby hold a roller portion of the roller against the sloped portion of the paint roller tray and to prevent the roller portion from sitting within the reservoir section; and the workstation further comprising a mating paint roller configured to mate with the roller holder, the mating paint roller having a handle, a roller holder portion, and a frame situated between the roller holder and the handle, and wherein the frame has a handle extension portion of the frame which extends from the handle along a handle axis and which is configured to be held in the roller holder recess, wherein the roller portion is configured to be rotatably coupled with a paint roller pad such that the roller pad is capable of being rotated about a roller axis, and wherein the handle axis and the roller axis are generally perpendicular with one another but do not intersect with one another.

16. The paint workstation of claim 15 wherein the frame of the mating paint roller further includes a roller support portion adjacent to the roller holder, wherein the roller support portion and the roller holder portion are situated in a roller plane which is substantially parallel to the handle axis.

17. The workstation of claim 8 further comprising an insert mold accessory having mold body which includes a mold surface configured substantially similar to the paint roller tray thereby allowing a formable material to be inserted between the mold body and the paint roller tray, thus allowing for the creation of a disposable tray insert which can be nested within the paint roller tray.

* * * * *